US010608277B2

(12) United States Patent
Lecuyer et al.

(10) Patent No.: US 10,608,277 B2
(45) Date of Patent: Mar. 31, 2020

(54) ORGANIC LITHIUM BATTERY

(71) Applicants: BLUE SOLUTIONS, Ergue Gaberic (FR); CENTRE NATIONAL DE LA RECHERCHE SCIENTIFIQUE, Paris (FR); UNIVERSITE DE NANTES, Nantes (FR)

(72) Inventors: Margaud Lecuyer, Combrit (FR); Marc Deschamps, Quimper (FR); Joël Gaubicher, Nantes (FR); Philippe Poizot, Treillieres (FR); Dominique Guyomard, Sautron (FR); Bernard Lestriez, Nantes (FR)

(73) Assignees: BLUE SOLUTIONS, Ergue Gaberic (FR); CENTRE NATIONAL DE LA RECHERCHE SCIENTIFIQUE, Paris (FR)

(*) Notice: Subject to any disclaimer, the term of this patent is extended or adjusted under 35 U.S.C. 154(b) by 175 days.

(21) Appl. No.: 15/533,491

(22) PCT Filed: Dec. 8, 2015

(86) PCT No.: PCT/FR2015/053371
§ 371 (c)(1),
(2) Date: Jun. 6, 2017

(87) PCT Pub. No.: WO2016/092199
PCT Pub. Date: Jun. 16, 2016

(65) Prior Publication Data
US 2017/0352913 A1 Dec. 7, 2017

(30) Foreign Application Priority Data
Dec. 10, 2014 (FR) .................... 14 62165

(51) Int. Cl.
*H01M 10/0525* (2010.01)
*H01M 2/16* (2006.01)
*H01M 4/60* (2006.01)
*H01M 2/18* (2006.01)
*H01M 10/0569* (2010.01)
*H01M 4/139* (2010.01)
*H01M 10/052* (2010.01)
*H01M 4/40* (2006.01)
*H01M 4/62* (2006.01)
*H01M 4/1391* (2010.01)
*H01M 4/1397* (2010.01)

(52) U.S. Cl.
CPC ..... *H01M 10/0525* (2013.01); *H01M 2/1653* (2013.01); *H01M 2/18* (2013.01); *H01M 4/139* (2013.01); *H01M 4/405* (2013.01); *H01M 4/60* (2013.01); *H01M 4/622* (2013.01); *H01M 10/052* (2013.01); *H01M 10/0569* (2013.01); *H01M 4/1391* (2013.01); *H01M 4/1397* (2013.01)

(58) Field of Classification Search
None
See application file for complete search history.

(56) References Cited

U.S. PATENT DOCUMENTS

| 5,176,953 A | 1/1993 | Jacoby et al. | |
|---|---|---|---|
| 2002/0110729 A1* | 8/2002 | Hozumi | H01G 4/32 429/130 |
| 2004/0253512 A1* | 12/2004 | Watanabe | H01M 2/08 429/210 |
| 2009/0219672 A1 | 9/2009 | Masuda et al. | |
| 2012/0202103 A1* | 8/2012 | Yu | H01M 10/4257 429/144 |
| 2012/0264880 A1* | 10/2012 | Javier | C08G 81/00 525/185 |
| 2013/0004836 A1 | 1/2013 | Otsuka et al. | |
| 2013/0130102 A1* | 5/2013 | Sakamoto | C07D 307/12 429/200 |
| 2013/0177755 A1* | 7/2013 | Kang | B01D 69/02 428/220 |
| 2014/0272603 A1 | 9/2014 | Yang et al. | |
| 2016/0197375 A1* | 7/2016 | Carlson | H01M 10/0565 429/303 |
| 2016/0218352 A1* | 7/2016 | Musameh | H01M 4/136 |

FOREIGN PATENT DOCUMENTS

| JP | 2010171006 | 5/2010 |
|---|---|---|
| WO | 2012060445 | 5/2014 |

OTHER PUBLICATIONS

International Search Report dated Jul. 30, 2015.
Organic electrode materials for rechargeable lithium batteries dated May 21, 2012.
A rechargeable lithium/quinone battery using a commercial polymer electrolyte dated Mar. 19, 2015.
Japanese Office Action dated Oct. 15, 2019.

* cited by examiner

Primary Examiner — Scott J. Chmielecki
(74) Attorney, Agent, or Firm — IPSILON USA, LLP

(57) ABSTRACT

The present invention relates to the field of organic lithium batteries having high energy and power densities. In particular, the present invention relates to an organic lithium battery comprising a positive electrode based on redox organic compounds and a porous separator made of biaxially oriented polypropylene, and to its process of manufacture.

22 Claims, 1 Drawing Sheet

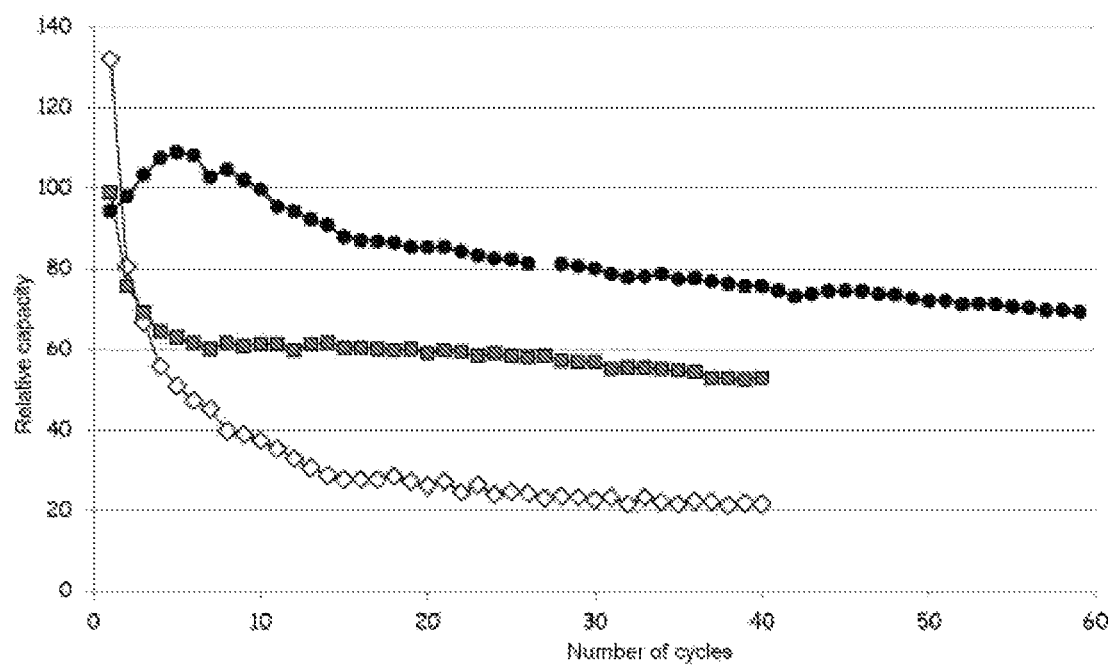

ORGANIC LITHIUM BATTERY

RELATED APPLICATION

This application is a National Phase of PCT/FR2015/053371, filed on Dec. 8, 2015 which in turn claims the benefit of priority from French Patent Application No. 14 62165, filed on Dec. 10, 2014, the entirety of which are incorporated by reference.

BACKGROUND

Field of the Invention

The present invention relates to the field of organic lithium batteries having high energy and power densities. In particular, the present invention relates to an organic lithium battery comprising a positive electrode based on redox organic compounds and a porous separator made of biaxially oriented polypropylene, and to its process of manufacture.

Description of Related Art

Lithium batteries have become essential constituents in numerous devices which comprise portable appliances, such as in particular mobile telephones, computers and lightweight equipment, or heavier appliances, such as two-wheel transportation means (bicycles, mopeds) or four-wheel transportation means (electric or hybrid motor vehicles). They are also widely studied for use in the field of stationary energy storage.

A lithium metal battery comprises at least one negative electrode and at least one positive electrode, between which is placed a separator impregnated with a liquid electrolyte or a solid polymer electrolyte providing by itself both the physical separation of the electrodes and the transportation of the lithium ions. The negative electrode consists of a sheet of lithium metal or of a lithium alloy, optionally supported by a current collector, and the positive electrode consists of a current collector supporting an electrode material containing at least one positive electrode active material capable of reversibly inserting lithium ions, optionally a polymer which acts as binder (e.g. poly(vinylidene fluoride) or PVDF) and/or optionally an agent generating an electron conductivity (e.g. carbon black). The liquid electrolyte for example consists of a lithium salt (e.g. $LiBF_4$, $LiClO_4$, $LiPF_6$, and the like) in solution in a solvent chosen in order to optimize the transportation and the dissociation of the ions. Conventional electrolyte solvents (e.g. propylene carbonate, γ-butyrolactone, sulpholane, dimethoxyethane, tetrahydrofuran, 1,3-dioxolane, and the like) are saturated under normal conditions at approximately 1-1.5 mol/l of lithium salt. The separator has, for its part, to provide perfect insulation between the two electrodes in order to prevent any risk of short-circuit and to have:
- an appropriate mechanical strength, in order to withstand the stresses due to the variations in volume of the active materials during the charging and discharging cycles,
- a sufficient chemical resistance, in order to ensure that it holds over time since it is immersed in a highly corrosive solution (i.e. electrolyte), and
- an appropriate porous structure, in order to make possible the diffusion of the anions and cations of the electrolyte and to prevent any transportation of active material from one electrode to the other.

The separator is generally made of a porous material which does not conduct electrons, for example made of a polymer material based on polyolefins (e.g. polyethylene) or made of fibres (e.g. glass fibres or wood fibres).

During the operation of the battery, lithium ions pass from one to the other of the electrodes through the electrolyte. During discharging of the battery, an amount of lithium reacts with the positive electrode active material from the electrolyte and an equivalent amount is introduced into the electrolyte from the active material of the negative electrode, the concentration of lithium thus remaining constant in the electrolyte. The insertion of the lithium into the positive electrode is compensated for by supplying electrons from the negative electrode via an external circuit. During charging, the reverse phenomena take place.

The various constituents of a lithium battery are chosen so as to produce, at the lowest possible cost, batteries which have a high energy density, which have a good cycling stability and which operate with safety.

For historical reasons but also for reasons of electrochemical performance levels, the technologies currently commercialized are based on the virtually exclusive use of inorganic electrode materials, mainly based on transition metals, such as Co, Mn, Ni or Fe. However, these inorganic electrode materials (e.g. $LiCoO_2$, $LiMnO_4$, $LiFePO_4$, $LiNi_{0.8}Co_{0.15}Al_{0.05}O_2$, $LiNi_{1/3}Mn_{1/3}Co_{1/3}O_2$, $LiNi_{0.5}Mn_{1.5}O_4$, and the like) exhibit numerous disadvantages, such as the risk of explosion of the battery, their high toxicity, their difficulty of recycling, their high cost and/or their low specific capacity. In addition, these inorganic materials are generally prepared from resources of geological (i.e. non-renewable) origin and are energy consuming in their process. In view of the production volumes forecast for batteries (several billion units per year for the Li-ion technology), there is a risk of these inorganic electrode materials no longer being available in a large amount in the long run. Furthermore, none of the existing technologies fully meets requirements, while new environmental standards are appearing at the European level (see http://ec.europa.eu/environment/waste/batteries/, directive 2006/66/EC).

In this context, the development of organic lithium batteries comprising, as positive electrode active material, a redox organic structure (e.g. nitroxide derivatives, polyaromatic compounds), that is to say an organic structure capable of carrying out one or more reversible oxidation/reduction reactions, in particular by exchanging electrons with an electrode and simultaneously by combining with lithium ions, allows certain potentialities to be anticipated. First of all, these redox organic structures exhibit the advantage of comprising chemical elements (C, H, N, O, S, in particular) which can potentially derive from renewable resources, thus rendering them more plentiful. Subsequently, they are destroyed fairly easily by simple combustion at relatively moderate temperature. In addition, their electrochemical properties (ion and electron conduction properties, value of the oxidation potential, specific capacity) can be adjusted by appropriate functionalization (e.g. incorporation of attractive groups close to the redox centre). Finally, the redox organic structures generally have a relative density of the order of 1 g/cm³; they are thus lighter than inorganic electrode materials and consequently result in lithium batteries exhibiting a reduced weight.

The studies carried out on organic lithium batteries since the start of the 80s have been exclusively centred on the search for novel redox organic structures and have shown that the fundamental properties required in order for a redox organic structure to be able to be employed as positive electrode active material are the electroactivity, the reversibility and a virtual insolubility in the electrolyte.

By way of example, π-conjugated conducting polymers, such as polypyrrole, polythiophene, polyaniline, polyacetylene or polyacryloxy(TEMPO) (with TEMPO: 2,2,6,6-tetramethylpiperidine-1-N-oxyl), have been used in lithium batteries as positive electrode material. However, these redox organic structures generally exhibit low specific capacities of the order of 100 mAh/g, in particular due to the fact that they do not make it possible to exchange more than 0.5 electron per monomer during the oxidation/reduction reactions.

The use of quinone derivatives as positive electrode active material, a quinone generally being characterized by two carbonyl functional groups present on an aromatic nucleus, has also aroused increasing interest. By way of example, 1,4-benzoquinone and 9,10-phenanthrenequinone (which exhibit two carbonyl functional groups) respectively have high theoretical specific capacities of the order of 500 mAh/g and 256 mAh/g. In addition, they can theoretically undergo a two-electron oxidation/reduction reaction. In particular, JPS5686466 describes an organic lithium battery comprising a negative electrode consisting of lithium metal; a positive electrode comprising 9,10-phenanthrenequinone as active material; a liquid electrolyte consisting of $LiClO_4$ in solution in propylene carbonate; and a separator impregnated with said liquid electrolyte. The battery exhibits a good stability as regards its discharge capacity. However, the reversibility of the oxidation/reduction reactions is insufficient and the mean discharge voltage is relatively low (i.e. of the order of 2-2.5 volts). Similar results were obtained with anthraquinone.

Thus, quinones comprising a larger number of carbonyl functional groups (e.g. three or four carbonyl functional groups) have been provided in order to improve the electrochemical performance levels of organic lithium batteries. For example, Yao et al. [*Int. J. of Electrochem. Sci.*, 2011, 6, 2905] have described an organic lithium battery comprising a negative electrode consisting of a sheet of lithium metal; a positive electrode consisting of a current collector made of aluminium supporting an electrode material comprising 5,7,12,14-pentacenetetrone (PT) as active material, acetylene black as agent generating an electron conductivity and polytetrafluoroethylene as binder; a liquid electrolyte consisting of lithium bis(trifluoromethanesulphonyl)imide (LiTFSI) as a 1 mol/l solution in γ-butyrolactone; and a separator made of glass fibres impregnated with said liquid electrolyte. However, the resistance to cycling of such a battery remains low since the initial specific capacity is of the order of 300 mAh/g and falls to 170 mAh/g after 10 cycles. This poor stability to cycling is mainly related to the solubility of the positive electrode active material (PT) in the solvent of the liquid electrolyte (cf. γ-butyrolactone). This is because the majority of the redox organic structures of low molar mass (i.e. molar mass of less than 3000 g/mol) are soluble in the solvent of the liquid electrolyte. Consequently, when a redox organic structure is used as electrode active material, the electron conductivity between the current collector and said active material becomes insufficient and the reactivity is reduced. In addition, the concentration of active material which may be involved in an oxidation/reduction reaction is decreased, which brings about a fall in the capacity of the battery.

Other redox organic structures based on indolin-3-one, such as indigo dye, also known as indigotine or 2-(1,3-dihydro-3-oxo-2H-indole-2-ylidene)-1,2-dihydro-3H-indole-3-one, have also been provided. In particular, Yao et al. [*Chem. Letters*, 2010, 39, 950] have described an organic lithium battery comprising a negative electrode consisting of a sheet of lithium metal; a positive electrode consisting of a current collector made of aluminium supporting an electrode material comprising indigotine as active material, acetylene black as agent generating an electron conductivity and polytetrafluoroethylene as binder; a liquid electrolyte consisting of lithium hexafluorophosphate ($LiPF_6$) as a 1 mol/l solution in a mixture of propylene carbonate and diethyl carbonate; and a separator impregnated with said liquid electrolyte. Here again, the specific capacity falls from 200 mAh/g to 20 mAh/g after approximately ten cycles, revealing a poor stability to cycling.

In order to avoid the dissolution of the active material in the electrolyte, Patent Application EP 2 546 907 A1 describes the manufacture of an organic lithium battery comprising a negative electrode consisting of a sheet of lithium metal; a positive electrode consisting of a current collector made of aluminium supporting an electrode material comprising a redox organic structure of pyrene-4,5,9,10-tetraone type corresponding to the following formula (1):

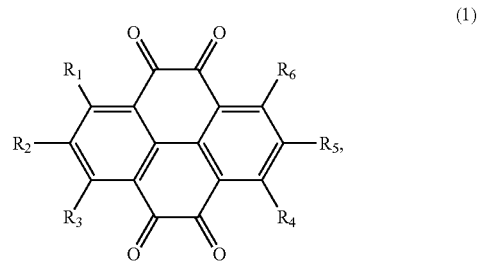

acetylene black as agent generating an electron conductivity and polytetrafluoroethylene as binder; a liquid electrolyte consisting of lithium hexafluorophosphate ($LiPF_6$) as a 1 mol/l solution in a mixture of ethylene carbonate and ethyl methyl carbonate; and a porous separator made of polyethylene impregnated with said liquid electrolyte. The performance levels of the organic lithium battery are improved in terms of resistance to cycling and of mean discharge voltage. However, the preparation of the redox organic structure corresponding to the formula (1) is complex (i.e. it comprises a large number of stages) and lengthy.

In parallel, Patent Application EP 0 492 942 A2 describes the manufacture of a porous biaxially oriented film based on polypropylene and polyethylene and its use in a large number of applications, such as filters, separators of electrochemical cells, reverse osmosis membranes, waterproofing membranes, coatings for motor vehicle accessories, surgical drapes and protective clothing for use in hospitals and in electronic clean rooms, and the like. However, said porous biaxially oriented film made of polymer material is not optimized to be used specifically in an organic lithium battery. This is because the separators depend on the performance levels desired for a given application. Thus, the porous film as described does not make it possible to guarantee sufficient electrochemical stability and sufficient mechanical strength (e.g., size of the pores of greater than 5 μm) and a discharge capacity which is stable over several cycles. This is because, as the size of the pores can reach values of the order of approximately 20 μm, such a separator leads to the prediction of the diffusion of the redox organic structures but also the appearance of short-circuits, unless it exhibits a very high thickness, then resulting in a significant lowering in the energy density by volume of the battery envisaged. In addition, it is not specified with what types of solvents said separator is compatible.

OBJECT AND SUMMARY

Thus, the aim of the present invention is to overcome the disadvantages of the abovementioned prior art and to provide an economical organic lithium battery which employs relatively inexpensive, recyclable and non-toxic starting materials and which exhibits good electrochemical performance levels, in particular in terms of resistance to cycling.

These aims are achieved by the invention which will be described below.

A first subject matter of the invention is thus an organic lithium battery comprising:
  a negative electrode comprising lithium metal or an alloy of lithium metal,
  a positive electrode optionally supported by a current collector, said positive electrode comprising at least one redox organic structure, at least one polymer binder $P_1$ and at least one agent generating an electron conductivity, said redox organic structure being different from the sulphur-comprising agents chosen from elemental sulphur $S_8$ and sulphur-comprising organic compounds comprising at least one S—S bond, and
  a porous separator impregnated with an electrolyte,
said organic lithium battery being characterized in that the porous separator is a biaxially oriented separator comprising at least polypropylene and the electrolyte comprises at least one liquid linear or cyclic polyether of low molar mass and at least one lithium salt $L_1$.

The inventors of the present patent application have thus discovered that the use of a biaxially oriented separator comprising at least polypropylene in combination with the presence of a liquid linear or cyclic polyether of low molecular weight in the electrolyte of the organic lithium battery makes it possible to significantly improve the electrochemical performance levels of said battery, in particular in terms of stability of the specific capacity during the discharging over a large number of cycles, and to optimize the transportation of the lithium ions.

The biaxially oriented separator used in the organic lithium battery of the invention also makes it possible to ensure the electrical separation of the electrodes, while preventing or limiting the diffusion of the redox organic structure from the positive electrode in the battery. In addition, the separator is stable with regard to the electrolyte of the battery, whether said electrolyte is in the liquid or solid form (e.g. gelled polymer electrolyte).

In addition, the organic lithium battery of the invention exhibits the advantage of being able to be employed with various redox organic structures without, however, having to modify their structures, in particular by addition of new functional groups.

In the present invention, "a liquid linear or cyclic polyether of low molar mass" means a liquid linear or cyclic polyether with a molar mass of less than or equal to 10 000 g·mol$^{-1}$ approximately, preferably of less than or equal to 2000 g·mol$^{-1}$ approximately and more preferably of less than or equal to 600 g·mol$^{-1}$ approximately.

In a specific embodiment of the invention, the separator exhibits a thickness ranging from 5 µm to 50 µm approximately, preferably from 10 µm to 40 µm approximately and more preferably from 10 µm to 30 µm approximately.

This is because the separator must not be too thin, in order to exhibit good mechanical strength and electrochemical behaviour during the cycling, to avoid short-circuits and to accommodate a sufficient amount of electrolyte. However, it must not be too thick, otherwise the battery will be penalized in terms of energy densities by weight and by volume (mass effect) and in terms of performance levels at high rate or at low temperature (polarization effect).

According to a preferred embodiment of the invention, the porous separator exhibits a porosity of greater than or equal to 50% by volume approximately, preferably of greater than or equal to 55% by volume approximately and more preferably of greater than or equal to 60% by volume approximately.

In a specific embodiment, the porous separator exhibits pores with a mean size ranging from 50 nm to 3 µm approximately, preferably from 50 nm to 1 µm approximately and more preferably from 100 nm to 500 nm approximately.

By virtue of this porosity, said separator can be easily impregnated by the electrolyte while guaranteeing a sufficient mechanical strength.

This is because the porous separator of the invention exhibits a puncture strength of at least 30 newtons approximately and preferably of at least 40 newtons approximately.

In addition, the porous separator of the invention exhibits an elongation at break of at least 5 mm approximately and preferably of at least 10 mm approximately. This elongation is measured during puncture tests using a metal punch, at ambient temperature.

The porous separator can exhibit a porosity of Gurley type ranging from 50 to 500 s/100 cm$^3$ approximately and preferably ranging from 50 to 400 s/100 cm$^3$ approximately. The porosity of Gurley type $P_{Gurley}$ indicates the time taken (in seconds) for 100 cm$^3$ of air to pass through 1 square inch of separator. The porosity of Gurley type $P_{Gurley}$ reflects the permeability of a separator: the lower the $P_{Gurley}$ value, the more the exchanges through the separator are favoured and thus the more the diffusion of the entities is facilitated.

The porous separator can exhibit a heat shrinkage in the longitudinal direction (i.e. longitudinal shrinkage) and/or a heat shrinkage in the transverse direction (i.e. transverse shrinkage) strictly of less than 15% approximately and preferably strictly of less than 10% approximately, whatever its thickness (the shrinkage is measured at 100° C. for 1 hour).

This is because the biaxially oriented porous separator has to have a heat shrinkage which is sufficiently low to be able to withstand temperature rises in the organic lithium battery and thus to prevent the battery from being damaged by uncontrolled heating. Its use in the process for the manufacture of the cells is furthermore facilitated.

In the present invention, the expression "biaxially oriented" means that the separator has been obtained by drawing in a longitudinal direction (machine direction) and in a direction transverse to the longitudinal direction.

The polypropylene of the porous separator can be a homopolymer of polypropylene (PP) or a copolymer of polypropylene.

The porous separator can additionally comprise a polymer material chosen from polyethylene, a copolymer of polyethylene and one of their mixtures.

When the porous separator comprises other polymer materials than polypropylene, it comprises at least 90% by weight of polypropylene and preferably at least 95% by weight of polypropylene, with respect to the total weight of the separator.

The porous separator of the invention can consist solely of polypropylene.

The porous separator preferably does not contain any inorganic filler and/or any ceramic.

The porous separator preferably does not comprise constituent(s) which can react with the active material of the positive electrode or its derivatives reduced during the cycling.

The porous separator can be monolayer or multilayer. When it is multilayer, it is preferably bilayer, so as to exhibit the lowest possible thickness without, however, harming its mechanical properties.

The porous separator should have good wettability properties with regard to the electrolyte used so that its impregnation is easy, in particular by performing a simple contacting operation when the electrolyte is liquid or by colaminating when the electrolyte is a gelled polymer electrolyte.

The liquid polyether of low molar mass is preferably linear.

The liquid linear or cyclic polyether of low molar mass of the electrolyte of the battery of the invention can be chosen from:
  polyethylene glycols of formula H—[O—$CH_2$—$CH_2$]$_m$—OH in which m is between 1 and 13,
  glycol ethers of formula R—[O—$CH_2$—$CH_2$]$_p$—O—R' in which p is between 1 and 13 and R and R', which are identical or different, are linear, branched or cyclic alkyl groups which can comprise from 1 to 20 carbon atoms,
  ethers of formula $R^1$—[$CH_2$—O]$_q$—$R^{1'}$ in which q is between 1 and 13 and $R^1$ and $R^{1'}$, which are identical or different, are linear, branched or cyclic alkyl groups which can comprise from 1 to 20 carbon atoms and optionally heteroatoms,
  cyclic ethers which can comprise from 2 to 20 carbon atoms, cyclic polyethers which can comprise from 3 to 40 carbon atoms, and
  one of their mixtures.

The polyether(s) used in the electrolyte of the invention is (are) particularly stable with regard to lithium and redox organic structures, thus making it possible to limit side reactions as much as possible.

In a preferred embodiment, the liquid linear or cyclic polyether of low molar mass is tetraethylene glycol dimethyl ether (TEGDME) of formula $CH_3O$—($CH_2$—$CH_2$)$_4$—$OCH_3$ (i.e. R and R'=$CH_3$ and p=4) or tetraethylene glycol (TEG) of formula H—(O—$CH_2$—$CH_2$)$_4$—OH (i.e. m=4).

The lithium salt $L_1$ can be chosen from lithium fluorate ($LiFO_3$), lithium bis(trifluoromethanesulphonyl)imide (LiTFSI), lithium hexafluorophosphate ($LiPF_6$), lithium fluoroborate ($LiBF_4$), lithium metaborate ($LiBO_2$), lithium perchlorate ($LiClO_4$), lithium nitrate ($LiNO_3$), lithium bis(fluorosulphonyl)imide (LiFSI), lithium bis(oxalato)borate (LiBOB or $LiB(C_2O_4)_2$) and their mixtures.

LiTFSI is the preferred lithium salt $L_1$ and it can optionally be combined with lithium nitrate ($LiNO_3$).

It is obvious that the electrolyte of the battery of the invention is non-aqueous, that is to say that it thus does not comprise water or aqueous solvents. This is because an aqueous electrolyte is not compatible with a negative electrode made of lithium metal.

The electrolyte preferably does not comprise organic solvents of carbonate type, the latter being unstable in the presence of a lithium electrode in the long term and having a tendency to result in the formation of a lithium foam, bringing about an irreversible consumption of the negative electrode.

According to a first alternative form, the electrolyte is a liquid electrolyte. It then completely saturates the porous separator in order to impregnate the porosity thereof.

According to this first alternative form, the concentration of the lithium salt $L_1$ in the liquid electrolyte ranges from 0.5 to 8 mol/l approximately, preferably from 1 to 5 mol/l approximately and more preferably from 1 to 2 mol/l approximately.

The liquid electrolyte can consist of a lithium salt $L_1$ in solution in a solvent comprising at least one liquid linear or cyclic polyether of low molar mass.

The liquid electrolyte can consist solely of a lithium salt $L_1$ and of a liquid linear or cyclic polyether of low molar mass.

The liquid electrolyte is preferably a solution comprising 1.5 mol/l approximately of LiTFSI in TEGDME or in TEG.

According to a second alternative form, the electrolyte is a gelled polymer electrolyte; it is then deposited on the separator in order to impregnate the porosity thereof and to form a self-supported dry electrolyte film.

According to this second alternative form, the electrolyte additionally comprises at least one polymer binder $P_2$.

The polymer binder $P_2$ can have a molar mass strictly of greater than 10 000 g·$mol^{-1}$ approximately, preferably strictly of greater than 50 000 g·$mol^{-1}$ approximately and more preferably strictly of greater than 100 000 g·$mol^{-1}$ approximately.

The polymer binder $P_2$ can be chosen from homopolymers and copolymers of ethylene; homopolymers and copolymers of propylene; homopolymers and copolymers of ethylene oxide (e.g. PEO, copolymer of PEO), of methylene oxide, of propylene oxide, of epichlorohydrin or of allyl glycidyl ether, and their mixtures; halogenated polymers, such as homopolymers and copolymers of vinyl chloride, of vinylidene fluoride (PVDF), of vinylidene chloride, of tetrafluoroethylene or of chlorotrifluoroethylene, copolymers of vinylidene fluoride and of hexafluoropropylene (PVDF-co-HFP) or their mixtures; non-electron-conducting polymers of anionic type, such as poly(styrenesulphonate), poly(acrylic acid), poly(glutamate), alginate, pectin, gelatin or their mixtures; polymers of cationic type, such as polyethyleneimine (PEI), polyaniline in the emeraldine salt (ES) form, poly(quaternized N-vinylimidazole), poly(acrylamide-co-diallyldimethylammonium chloride) (AMAC) or their mixtures; polyacrylates; and one of their mixtures.

Copolymer is understood to mean, in the present invention, a polymer compound obtained from at least two different monomers.

The gelled polymer electrolyte can comprise from 20 to 70% by weight approximately of polymer binder $P_2$ and preferably from 30 to 60% by weight approximately of polymer binder $P_2$, with respect to the total weight of the gelled polymer electrolyte.

The preferred polymer binders $P_2$ are the copolymer of ethylene oxide and of propylene oxide and the copolymer of ethylene oxide and of butylene oxide.

The gelled polymer electrolyte can comprise from 15 to 45% by weight approximately of lithium salt $L_1$ and preferably from 20 to 35% by weight approximately of lithium salt $L_1$, with respect to the total weight of the gelled polymer electrolyte.

The gelled polymer electrolyte can comprise from 5 to 40% by weight approximately of liquid linear or cyclic polyether of low molar mass and preferably from 10 to 30% by weight approximately of liquid linear or cyclic polyether of low molar mass, with respect to the total weight of the gelled polymer electrolyte.

The battery in accordance with the invention can operate between 0 and 110° C. approximately and preferably between 20 and 100° C. approximately.

In a specific embodiment of the invention, the positive electrode of the battery of the invention comprises at least 45% by weight approximately of redox organic structure and preferably at least 60% by weight approximately of redox organic structure, with respect to the total weight of said positive electrode.

In the present invention, the expression "redox organic structure" means an electroactive organic structure capable of reversibly reacting with $L_1$, that is to say an organic structure capable of carrying out one or more reversible oxidation/reduction reactions, by exchanging electrons with an electrode and by simultaneously combining with lithium ions.

The redox organic structure represents the active material of the positive electrode (i.e. the positive electrode material) of the organic lithium battery of the invention.

In the present invention, the redox organic structure being different from the sulphur-comprising agents chosen from elemental sulphur $S_8$ and sulphur-comprising organic compounds comprising at least one S—S bond, it is not a positive electrode active material such as those generally used as positive electrode active material of a lithium-sulphur battery. The sulphur-comprising organic compounds comprising at least one S—S bond can be organic polysulphides, in particular those of general formula $R^2$—S—$S_n$—$R^3$ in which $R^2$ and $R^3$, which are identical or different, represent a linear, branched or cyclic alkyl chain which can comprise from 1 to 20 carbon atoms, n being between 1 and 50; or disulphide polymers exhibiting a sequence of S—S bonds which can be broken during the discharging cycle of a lithium-sulphur battery and reformed during the charging cycle. The sulphur-comprising organic compounds comprising at least one S—S bond can also be the compounds of formula $Li_2S_w$ in which w>1 or the carbon-sulphur polymers of formula $(C_2S_{x1})_{y1}$ in which $x_1$=2.5-50 and $y_1 \geq 2$.

The redox organic structure can be different from $Li_2S$, which corresponds to the discharged state of the compounds of formula $Li_2S_w$ as defined above.

According to a particularly preferred form of the invention, the redox organic structure comprises at least two carbonyl C═O functional groups, two thione C═S functional groups or two imine C═N functional groups, optionally present on at least one aromatic nucleus. The carbonyl functional groups are preferred.

In particular, the redox organic structure belongs to any one of the following families: the quinones, the anthraquinones, the benzoquinones, the naphthoquinones, the oxoindolylidenes, the compounds derived from the $C_6O_6$ backbone (i.e. rhodizonate derivatives), the compounds comprising at least one tetracyclic pyracene and the compounds derived from the calix[4]arene backbone.

The redox organic structure comprising at least two thione C═S functional groups can also be chosen from the sulphur-comprising equivalents of these compounds, for example the cyclohexadienedithiones, the compounds derived from the $C_2S_2(C_6H_4)_2$ backbone, the thio-indolylidenes and the derivatives of the $C_6O_nS_{6-n}$ backbone.

The positive electrode can comprise from 1 to 30% by weight approximately of agent generating an electron conductivity, preferably from 2 to 20% by weight approximately of agent generating an electron conductivity and more preferably from 2 to 10% by weight approximately of agent generating an electron conductivity, with respect to the total weight of the positive electrode.

The agent generating an electron conductivity suitable for the present invention is preferably chosen from carbon black, sp carbon, acetylene black, carbon fibres and nanofibres, carbon nanotubes, graphene, graphite, metal particles and fibres, and one of their mixtures.

The agent generating an electron conductivity is preferably carbon black.

Preferably, the agent generating an electron conductivity is in the form of spherical particles (i.e. in the form of beads) in order to promote the conduction, in particular in the direction perpendicular to the positive electrode (i.e. in the direction of its thickness), and thus to promote the electrochemical processes within the electrode. This is because the particles of agent generating an electron conductivity in the spherical form have a propensity to form three-dimensional conducting networks.

Mention may be made, as example of carbon black, of the carbon blacks sold under the references: Ketjenblack 600JD®, Ketjenblack 700JD® and Timcal Ensaco 350G®.

According to a specific embodiment, the positive electrode comprises from 2 to 30% by weight approximately of polymer binder $P_1$ and preferably from 5 to 20% by weight approximately of polymer binder $P_1$, with respect to the total weight of the positive electrode.

The polymer binder $P_1$ can be chosen from homopolymers and copolymers of ethylene; homopolymers and copolymers of propylene; homopolymers and copolymers of ethylene oxide (e.g. PEO, copolymer of PEO), of methylene oxide, of propylene oxide, of epichlorohydrin or of allyl glycidyl ether, and their mixtures; halogenated polymers, such as homopolymers and copolymers of vinyl chloride, of vinylidene fluoride (PVDF), of vinylidene chloride, of tetrafluoroethylene or of chlorotrifluoroethylene, copolymers of vinylidene fluoride and of hexafluoropropylene (PVDF-co-HFP) or their mixtures; polyacrylates, such as polymethyl methacrylate; polyalcohols, such as polyvinyl alcohol (PVA); electron-conducting polymers, such as polyaniline, polypyrrole, polyfluorenes, polypyrenes, polyazulenes, polynaphthalenes, polyacetylenes, poly(p-phenylene-vinylene), polycarbazoles, polyindoles, polyazepines, polythiophenes, poly(p-phenylene sulphide) or their mixtures; polymers of cationic type, such as polyethyleneimine (PEI), polyaniline in the emeraldine salt (ES) form, poly(quaternized N-vinylimidazole), poly(acrylamide-co-diallyldimethylammonium chloride) (AMAC) or their mixtures; polymers of anionic type, such as poly(styrenesulphonate), gelatin or pectin; and one of their mixtures.

The polymer binder $P_1$ is preferably PVDF-co-HFP, PVA, PEI, AMAC or one of their mixtures.

The positive electrode can additionally comprise at least one liquid linear or cyclic polyether of low molar mass as defined in the present invention.

The positive electrode can comprise from 2 to 30% by weight approximately of liquid linear or cyclic polyether of low molar mass and preferably from 5 to 20% by weight approximately of liquid linear or cyclic polyether of low molar mass, with respect to the total weight of the positive electrode.

The positive electrode can additionally comprise at least one lithium salt $L_2$.

The positive electrode can comprise from 1 to 25% by weight approximately of lithium salt $L_2$, preferably from 1 to 15% by weight approximately of lithium salt $L_2$ and more preferably from 1 to 10% by weight approximately of lithium salt $L_2$, with respect to the total weight of the positive electrode.

The lithium salt $L_2$ can be chosen from lithium fluorate (LiFO$_3$), lithium bis(trifluoromethanesulphonyl)imide (LiTFSI), lithium hexafluorophosphate (LiPF$_6$), lithium fluoroborate (LiBF$_4$), lithium metaborate (LiBO$_2$), lithium perchlorate (LiClO$_4$), lithium nitrate (LiNO$_3$), lithium bis (fluorosulphonyl)imide (LiFSI), lithium bis(oxalato)borate (LiBOB or LiB(C$_2$O$_4$)$_2$) and their mixtures.

LiTFSI is the preferred lithium salt $L_2$.

The positive electrode of the invention can exhibit a porosity of less than or equal to 40% by volume approximately and preferably of less than or equal to 30% by volume approximately, with respect to the total volume of the electrode. This thus makes it possible to improve the energy density of the battery.

It should be noted that the total weight of the positive electrode comprises the weight of the redox organic structure, the weight of the polymer binder $P_1$, the weight of the agent generating an electron conductivity, optionally the weight of the liquid linear or cyclic polyether of low molar mass, if it is present, and optionally the weight of the lithium salt $L_2$, if it is present.

The positive electrode can be prepared:

a) by mixing at least one redox organic structure with at least one agent generating an electron conductivity, at least one polymer binder $P_1$, optionally at least one lithium salt $L_2$, optionally at least one liquid linear or cyclic polyether of low molar mass and optionally at least one solvent of said polymer binder $P_1$, in order to obtain an electrode paste, b) by applying said electrode paste to at least one support, c) by drying said electrode paste in order to obtain a positive electrode in the form of a supported film.

The polymer binder $P_1$, the lithium salt $L_2$ and the liquid linear or cyclic polyether of low molar mass are as defined in the present invention.

Stage a) can be carried out by extrusion or by grinding.

Extrusion is highly advantageous since it makes it possible to easily obtain electrodes of low porosity while not using much solvent. It also makes it possible to avoid a stage of calendering on the dry electrode, which can cause structural modifications of the electrode, harm the good coating of the grains of the agent generating an electron conductivity and thus can cause collapse of the electrode during the cycling. Finally, the calendering stage exhibits the disadvantage of increasing the number of stages in order to obtain the electrode and thus its production cost.

The solvent of the polymer binder $P_1$ of stage a) makes it possible to dissolve said polymer binder $P_1$.

When it is present, said solvent preferably represents less than 30% by weight approximately of the total weight of the mixture of the redox organic structure, of agent generating an electron conductivity, of polymer binder $P_1$, optionally of lithium salt $L_2$ and optionally of liquid linear or cyclic polyether of low molar mass.

The use during the manufacture of the positive electrode of a small amount of solvent of the polymer binder $P_1$ makes it possible to result in a positive electrode of low porosity (i.e. ≤40% by volume approximately). This low porosity makes it possible to control and to optimize the amount of redox organic structure present in the positive electrode and thus to arrive at optimum energy densities by volume.

The solvent of stage a) can be chosen from water, N-methylpyrrolidone, solvents of carbonate type, such as ethylene carbonate, propylene carbonate, dimethyl carbonate, diethyl carbonate or ethyl methyl carbonate, acetone, alcohols, such as methanol, ethanol or propanol, and their mixtures.

The solvent is preferably chosen from water, acetone, alcohols and their mixtures.

Stage b) can be carried out by laminating or by coating.

The support can be a current collector and/or a support film.

Mention may be made, as example of current collector, of a current collector made of aluminium covered with a carbon-based layer (corrosion-resistant layer).

Mention may be made, as example of support film, of a plastic film of silicone-treated polyethylene terephthalate (PET) type.

The positive electrode supported film obtained on conclusion of stage c) can have a thickness ranging from 2 to 100 μm approximately and preferably from 10 to 60 μm approximately.

Stage c) can be carried out at a temperature sufficient to make it possible to remove the solvent of stage a).

A second subject matter of the invention is a process for the manufacture of an organic lithium battery as defined in the first subject matter of the invention, characterized in that it comprises the following stages:

A) a stage of preparation of a liquid electrolyte or of a gelled polymer electrolyte as defined in the present invention, in particular by mixing at least one liquid linear or cyclic polyether of low molar mass with at least one lithium salt $L_1$, B) a stage of assembling a positive electrode, a negative electrode and a porous separator as are defined in the present invention, said process additionally comprising one or other of the following stages:

C-1) a stage of impregnation of the assembly as obtained in stage B) by the liquid electrolyte prepared in stage A), or C-2) a stage of impregnation of the porous separator by the gelled polymer electrolyte prepared in stage A), said impregnation being prior to the assembling stage B).

The liquid linear or cyclic polyether of low molar mass, the lithium salt $L_1$ and the polymer binder $P_2$ are as defined in the first subject matter of the invention.

The liquid electrolyte of stage A) is preferably prepared by dissolving, with stirring, at least one lithium salt $L_1$ in a liquid linear or cyclic polyether of low molar mass, optionally at a temperature ranging from 20 to 120° C. approximately.

The gelled polymer electrolyte of stage A) can be obtained by extrusion of at least one polymer binder $P_2$ with a solution comprising at least one liquid linear or cyclic polyether of low molar mass and at least one lithium salt $L_1$, in order to obtain an electrolyte paste, and then by laminating the electrolyte paste, in particular between two support films, in order to obtain a gelled polymer electrolyte film.

The extrusion can be carried out at a temperature ranging from 60 to 170° C. approximately.

The two support films can be plastic films of silicone-treated PET.

The impregnation of the separator by the gelled polymer electrolyte (cf. stage C-2)) can be carried out by colaminating the separator and the gelled polymer electrolyte film, in particular at a temperature of 80° C. approximately, and preferably at a pressure of 5 bar approximately.

Stages A) and C-2) can be one and the same stage during which the electrolyte paste obtained by extrusion is laminated directly on the separator in order to obtain a separator impregnated with a gelled polymer electrolyte.

BRIEF DESCRIPTION OF THE DRAWINGS

FIG. 1 is a graph from example 1 of the specific capacity (in mAh/g) the battery B-1 (curve with the solid circles), of the battery B-2 (curve with the solid squares) and of the battery B-3 (curve with the open diamonds) as a function of the number of cycles at a current rate of C/4 and at a temperature of 100° C.

DETAILED DESCRIPTION

The present invention is illustrated by the examples below, to which, however, it is not limited.

EXAMPLES

The starting materials used in the examples are listed below:
Ketjenblack 600JD® carbon black, AkzoNobel,
Anthraquinone, with a purity of 97%, Sigma Aldrich,
Polyethyleneimine (PEI), at 50% by weight in water, Fluka, Sigma Aldrich,
LiTFSI, 3M,
Silicone-treated PET film, Mitsubishi,
Tetraethylene glycol dimethyl ether (TEGDME), with a purity of 99%, Sigma Aldrich,
copolymer of PEO (co-PEO), Mw~$10^5$ g·mol$^{-1}$, ZSN 8100, Zeospan,
Biaxially oriented monolayer separator made of polypropylene S-1, BPF220, Bolloré,
Monolayer separator made of polypropylene S-2, Celgard 2500.
Unless otherwise indicated, all the materials were used as received from the manufacturers.

Example 1

Manufacture of an Organic Lithium Battery in Accordance with the Invention 1.1 Preparation of the Positive Electrode 2.25 g of Ketjenblack carbon black were mixed manually with 31.5 g of anthraquinone at ambient temperature.

The mixture prepared above was subsequently mixed, at 80° C. for 20 minutes, with 5.085 g of tetraethylene glycol dimethyl ether (TEGDME), 9 g of 50% solution of polyethyleneimine (PEI), 1.665 g of lithium salt (LiTFSI) and 5 g of water in a mixer sold under the Plastograph® EC trade name by Brabender®. The amount of water used represented 20% by weight approximately of the total weight of the carbon black, of the anthraquinone, of the polyethyleneimine PEI and of the lithium salt LiTFSI.

The paste thus obtained was subsequently laminated at 95° C. on a current collector made of aluminium covered with a carbon-based layer.

The film thus obtained was dried at 120° C. for 20 minutes in an oven in order to obtain a positive electrode E-1 in the form of a film in accordance with the invention.

The composition by weight of the positive electrode E-1 obtained is presented in Table 1 below:

TABLE 1

| Positive electrode | Carbon black (%) | TEGDME (%) | Lithium salt (%) | PEI (%) | Anthraquinone (%) |
|---|---|---|---|---|---|
| E-1 | 5 | 11.3 | 3.7 | 10 | 70 |

1.2 Preparation of a Liquid Electrolyte and Characteristics of the Separators Used A liquid electrolyte consisting of LiTFSI in tetraethylene glycol dimethyl ether (TEGDME) and comprising 30.1% by weight of LiTFSI was prepared. A 1.51 mol/l solution of lithium salt in TEGDME was thus obtained.

The characteristics of the separators S-1 and S-2 used in the present example: the thickness t (in μm), the porosity P (in %), the porosity of Gurley type $P_{Gurley}$ (in s/100 cm$^3$), the longitudinal heat shrinkage measured at 100° C. for 1 hour $R_L$ (in %), the transverse heat shrinkage measured at 100° C. for 1 hour $R_T$ (in %), the maximum puncture strength $F_{max}$ (in newtons N) and the elongation at break E (in mm), are presented in Table 2 below.

The porosity of Gurley type $P_{Gurley}$ is measured using an automatic densimetre sold under the trade name Guenine Gurley Model 4340.

The porosity P is calculated by comparing the true thickness of the separator and its theoretical thickness estimated from its weight and from the density of the polypropylene.

The longitudinal $R_L$ and transverse $R_T$ heat shrinkages were estimated according to Standard ISO11501 (data obtained from the suppliers of the separators).

The maximum puncture strength $F_{max}$ and the elongation at break E were obtained using ASTM D3420 puncture tests carried out at ambient temperature using a universal testing machine sold under the trade name Adamel-Lhomargy of DY32 type.

TABLE 2

| Separator | t (μm) | P (%) | $P_{Gurley}$ (s/100 cm$^3$) | $R_L$ (%) | $R_T$ (%) | $F_{max}$ (N) | E (mm) |
|---|---|---|---|---|---|---|---|
| S-1 | 15 | >50 | 95 | 2 | 6.5 | 41 | 17 |
| S-2 | 25 | 55 | 180 | 5$^a$ | 0$^a$ | 63 | 30.1 |

$^a$heat shrinkages measured at 90° C. instead of 100° C.

1.3 Preparation of a Solid Polymer Electrolyte

The solid polymer electrolyte was prepared by extrusion of a mixture of lithium salt (LiTFSI), of copolymer of PEO Zeospan® and of PVDF-co-HFP, and then by laminating the electrolyte paste obtained at 125° C. between two plastic films of silicone-treated PET.

The composition by weight of the solid polymer electrolyte obtained is presented in Table 3 below:

TABLE 3

| Solid polymer electrolyte | TEGDME (%) | Lithium salt (%) | Co-PEO (%) | PVDF-co-HFP (%) |
|---|---|---|---|---|
| SP-1 | 0 | 12 | 48 | 40 |

1.4 Manufacture of Organic Lithium Batteries

Three batteries B-1, B-2 and B-3 were prepared by assembling, under an anhydrous atmosphere (air with a dew point<−40° C.), by manual laminating at ambient temperature:
  the positive electrode E-1 obtained in Example 1.1 above,
  a negative electrode comprising lithium metal in the form of a film of lithium metal with a thickness of approximately 100 μm, and
  the separator S-1 impregnated with the liquid electrolyte obtained in Example 1.2 above, or the separator S-2 impregnated with the liquid electrolyte obtained in Example 1.2 above, or the solid polymer electrolyte SP-1 obtained in Example 1.3 above.

The battery B-1 is in accordance with the invention since it comprises a positive electrode, a negative electrode, an electrolyte and a separator as are defined in the present invention.

On the other hand, the batteries B-2 and B-3 are not in accordance with the invention since B-2 does not comprise a separator as defined in the present invention and B-3 does not comprise separator and electrolyte as are defined in the present invention.

The specific capacity (in mAh/g) of the battery B-1 (curve with the solid circles), of the battery B-2 (curve with the solid squares) and of the battery B-3 (curve with the open diamonds) as a function of the number of cycles at a current rate of C/4 and at a temperature of 100° C. is given in FIG. 1.

These results show that the use of a biaxially oriented separator as defined in the present invention makes it possible to significantly improve the resistance to cycling of the organic lithium battery. In particular, FIG. 1 shows, for the battery B-3 (solid polymer electrolyte), a very rapid fall in the discharge capacity during the first cycles and the absence of stabilization in the subsequent cycles, probably related to a dissolution of the anthraquinone in the solid polymer electrolyte and thus its diffusion. In the same way, FIG. 1 shows, for the battery B-2 (uniaxially oriented separator), a very rapid fall in the discharge capacity during the first cycles.

The invention claimed is:

1. Organic lithium battery comprising:
    a negative electrode comprising lithium metal or an alloy of lithium metal,
    a positive electrode optionally supported by a current collector, said positive electrode comprising at least one redox organic structure, at least one polymer binder $P_1$ and at least one agent generating an electron conductivity,
    said redox organic structure being different from sulphur-comprising organic compounds having at least one S—S bond, and
    a porous separator impregnated with an electrolyte,
    wherein the porous separator is a biaxially oriented separator comprising at least polypropylene and the electrolyte comprises at least one liquid linear or cyclic polyether with a molar mass of less than or equal to 10 000 g·mol$^{-1}$, and at least one lithium salt $L_1$,
    wherein the positive electrode of the battery of the invention comprises at least 45% by weight of redox organic structure, with respect to the total weight of said positive electrode.

2. Battery according to claim 1, wherein the porous separator exhibits a thickness ranging from 5 μm to 50 μm.

3. Battery according to claim 1, wherein the porous separator exhibits a porosity of greater than or equal to 50% by volume.

4. Battery according to claim 1, wherein the porous separator exhibits pores with a mean size ranging from 50 nm to 3 μm.

5. Battery according to claim 1, wherein the porous separator exhibits an elongation at break of at least 5 mm.

6. Battery according to claim 1, wherein the porous separator exhibits a porosity of Gurley type ranging from 50 to 500 s/100 cm$^3$.

7. Battery according to claim 1, wherein the porous separator exhibits a heat shrinkage in the longitudinal direction and/or a heat shrinkage in the transverse direction strictly of less than 15%, whatever its thickness.

8. Battery according to claim 1, wherein the lithium salt $L_1$ is chosen from lithium fluorate (LiFO$_3$), lithium bis(trifluoromethanesulphonyl)imide (LiTFSI), lithium hexafluorophosphate (LiPF$_6$), lithium fluoroborate (LiBF$_4$), lithium metaborate (LiBO$_2$), lithium perchlorate (LiClO$_4$), lithium nitrate (LiNO$_3$), lithium bis(fluorosulphonyl)imide (LiFSI), lithium bis(oxalato)borate (LiBOB or LiB(C$_2$O$_4$)$_2$) and their mixtures.

9. Battery according to claim 1, wherein the electrolyte is a gelled polymer electrolyte and it additionally comprises at least one polymer binder $P_2$.

10. Battery according to claim 9, wherein the polymer binder $P_2$ is chosen from homopolymers and copolymers of ethylene; homopolymers and copolymers of propylene; homopolymers and copolymers of ethylene oxide, of methylene oxide, of propylene oxide, of epichlorohydrin or of allyl glycidyl ether, and their mixtures; halogenated polymers; non-electron-conducting polymers of anionic type; polyacrylates; polymers of cationic type; and one of their mixtures.

11. Battery according to claim 9, wherein the gelled polymer electrolyte comprises from 20 to 70% by weight of polymer binder $P_2$, with respect to the total weight of the gelled polymer electrolyte.

12. Battery according to claim 9, wherein the gelled polymer electrolyte comprises from 15 to 45% by weight of lithium salt $L_1$, with respect to the total weight of the gelled polymer electrolyte.

13. Battery according to claim 9, wherein the gelled polymer electrolyte comprises from 5 to 40% by weight of liquid linear or cyclic polyether of low molar mass, with respect to the total weight of the gelled polymer electrolyte.

14. Battery according to claim 1, wherein the electrolyte is a liquid electrolyte and the concentration of the lithium salt $L_1$ in the liquid electrolyte ranges from 0.5 to 8 mol/l.

15. Battery according to claim 1, wherein the redox organic structure comprises at least two carbonyl C=O functional groups, two thione C=S functional groups or two imine C=N functional groups.

16. Battery according to claim 1, wherein the positive electrode comprises from 1 to 30% by weight of agent generating an electron conductivity, with respect to the total weight of the positive electrode.

17. Battery according to claim 1, wherein the agent generating an electron conductivity is chosen from carbon black, sp carbon, acetylene black, carbon fibres and nanofibres, carbon nanotubes, graphene, graphite, metal particles and fibres, and one of their mixtures.

18. Battery according to claim 1, wherein the positive electrode comprises from 2 to 30% by weight of polymer binder $P_1$, with respect to the total weight of the positive electrode.

19. Battery according to claim 1, wherein the polymer binder $P_1$ is chosen from homopolymers and copolymers of ethylene; homopolymers and copolymers of propylene; homopolymers and copolymers of ethylene oxide, of methylene oxide, of propylene oxide, of epichlorohydrin or of allyl glycidyl ether, and their mixtures; halogenated polymers; polyacrylates; polyalcohols; electron-conducting polymers; polymers of cationic type; polymers of anionic type; and one of their mixtures.

20. Process for the manufacture of an organic lithium battery as defined in claim 1, wherein said process comprises the following stages:
    A) a stage of preparation of a liquid electrolyte or of a gelled polymer electrolyte,
    B) a stage of assembling a positive electrode, a negative electrode and a porous separator, said process additionally comprising one or other of the following stages:
    C-1) a stage of impregnation of the assembly as obtained in stage B) by the liquid electrolyte prepared in stage A), or C-2) a stage of impregnation of the porous separator by the gelled polymer electrolyte prepared in stage A), said impregnation being prior to the assembling stage B).

21. Organic lithium battery comprising:

a negative electrode comprising lithium metal or an alloy of lithium metal, a positive electrode optionally supported by a current collector, said positive electrode comprising at least one redox organic structure, at least one polymer binder $P_1$ and at least one agent generating an electron conductivity, said redox organic structure being different from sulphur-comprising organic compounds having at least one S—S bond, and a porous separator impregnated with an electrolyte, wherein the porous separator is a biaxially oriented separator comprising at least polypropylene, and wherein the electrolyte is a gelled polymer electrolyte comprising at least one liquid linear or cyclic polyether with a molar mass of less than or equal to 10 000 g·mol$^{-1}$, at least one polymer binder $P_2$, and from 15 to 45% by weight of at least one lithium salt $L_1$, with respect to the total weight of the gelled polymer electrolyte.

22. Organic lithium battery comprising:

a negative electrode comprising lithium metal or an alloy of lithium metal, a positive electrode optionally supported by a current collector, said positive electrode comprising at least one redox organic structure, at least one polymer binder $P_1$ and at least one agent generating an electron conductivity, said redox organic structure being different from sulphur-comprising organic compounds having at least one S—S bond, and a porous separator impregnated with an electrolyte, wherein the porous separator is a biaxially oriented separator comprising at least polypropylene, and wherein the electrolyte is a gelled polymer electrolyte comprising at least one lithium salt $L_1$, at least one polymer binder $P_2$, and from 5 to 40% by weight of at least one liquid linear or cyclic polyether with a molar mass of less than or equal to 10 000 g·mol$^{-1}$, with respect to the total weight of the gelled polymer electrolyte.

* * * * *